United States Patent
Thompson et al.

(10) Patent No.: US 9,542,040 B2
(45) Date of Patent: Jan. 10, 2017

(54) METHOD FOR DETECTION AND REJECTION OF POINTER CONTACTS IN INTERACTIVE INPUT SYSTEMS

(71) Applicant: SMART Technologies ULC, Calgary (CA)

(72) Inventors: Sean Thompson, Calgary (CA); Arden Albert, Calgary (CA); James Rempel, Calgary (CA); Grant McGibney, Calgary (CA)

(73) Assignee: SMART TECHNOLOGIES ULC, Calgary (CA)

(*) Notice: Subject to any disclaimer, the term of this patent is extended or adjusted under 35 U.S.C. 154(b) by 245 days.

(21) Appl. No.: 14/203,957

(22) Filed: Mar. 11, 2014

(65) Prior Publication Data
US 2014/0267106 A1    Sep. 18, 2014

Related U.S. Application Data
(60) Provisional application No. 61/792,660, filed on Mar. 15, 2013.

(51) Int. Cl.
*G06F 3/041* (2006.01)
*G06F 3/0481* (2013.01)
*G06F 3/0354* (2013.01)

(52) U.S. Cl.
CPC .......... *G06F 3/0418* (2013.01); *G06F 3/0481* (2013.01); *G06F 3/03545* (2013.01); *G06F 3/03547* (2013.01)

(58) Field of Classification Search
CPC .... G06F 3/04818; G06F 3/0421; G06F 3/042; G06F 3/0416; G06F 3/041; G06F 3/0481; G06F 3/033; G06F 3/0354; G06F 3/03545; G06F 3/03547
USPC ........................................................ 345/173
See application file for complete search history.

(56) References Cited

U.S. PATENT DOCUMENTS

| | | | |
|---|---|---|---|
| 5,448,263 A | 9/1995 | Martin | |
| 6,141,000 A | 10/2000 | Martin | |
| 6,337,681 B1 | 1/2002 | Martin | |
| 6,747,636 B2 | 6/2004 | Martin | |
| 6,803,906 B1 | 10/2004 | Morrison et al. | |
| 7,232,986 B2 | 6/2007 | Worthington et al. | |
| 7,236,162 B2 | 6/2007 | Morrison et al. | |
| 7,274,356 B2 | 9/2007 | Ung et al. | |
| 7,532,206 B2 | 5/2009 | Morrison et al. | |
| 8,982,045 B2* | 3/2015 | Hinckley | G06F 1/1649 345/156 |
| 9,134,849 B2* | 9/2015 | Chang | G06F 3/044 |
| 2003/0080946 A1* | 5/2003 | Chuang | G06F 3/0418 345/173 |
| 2003/0132922 A1* | 7/2003 | Philipp | G06F 3/044 345/173 |
| 2004/0179001 A1 | 9/2004 | Morrison et al. | |

(Continued)

FOREIGN PATENT DOCUMENTS
JP    WO 2012114876 A1 *    8/2012    ......... G06F 3/04883

*Primary Examiner* — Julie Anne Watko
(74) *Attorney, Agent, or Firm* — Perkins Coie LLP

(57) ABSTRACT

A method comprising obtaining a first location of a first pointer contact on an input surface; calculating a restricted area proximate the first location; processing the first pointer contact; and inhibit processing of a second location of a second pointer contact within the restricted area.

20 Claims, 7 Drawing Sheets

(56) References Cited

U.S. PATENT DOCUMENTS

| | | | |
|---|---|---|---|
| 2006/0109252 A1* | 5/2006 | Kolmykov-Zotov | G06F 3/03545 |
| | | | 345/173 |
| 2007/0268275 A1* | 11/2007 | Westerman ........... | G06F 3/0235 |
| | | | 345/173 |
| 2008/0012835 A1* | 1/2008 | Rimon ................... | G06F 3/038 |
| | | | 345/173 |
| 2010/0127995 A1* | 5/2010 | Rigazio ............... | G06F 3/04886 |
| | | | 345/173 |
| 2010/0182247 A1* | 7/2010 | Petschnigg ........... | G06F 1/1647 |
| | | | 345/173 |
| 2011/0012855 A1* | 1/2011 | Yeh ....................... | G06F 3/0416 |
| | | | 345/173 |
| 2011/0169736 A1 | 7/2011 | Bolt et al. | |
| 2011/0193727 A1* | 8/2011 | Goto ................... | G06F 3/03547 |
| | | | 341/20 |
| 2011/0291944 A1* | 12/2011 | Simmons .............. | G06F 3/0416 |
| | | | 345/173 |
| 2012/0007618 A1* | 1/2012 | Yeh ........................ | G06F 3/045 |
| | | | 324/705 |
| 2012/0105481 A1* | 5/2012 | Baek ................... | G06F 3/04886 |
| | | | 345/652 |
| 2012/0242591 A1* | 9/2012 | Kawalkar ........... | G06F 3/04886 |
| | | | 345/173 |
| 2013/0300672 A1* | 11/2013 | Griffin ............... | G06F 3/04883 |
| | | | 345/173 |
| 2013/0328819 A1* | 12/2013 | Miyano .............. | G06F 3/04883 |
| | | | 345/173 |
| 2014/0022193 A1* | 1/2014 | Kim ..................... | G06F 3/0488 |
| | | | 345/173 |
| 2014/0111415 A1* | 4/2014 | Gargi ..................... | G06F 3/017 |
| | | | 345/156 |

* cited by examiner

US 9,542,040 B2

METHOD FOR DETECTION AND REJECTION OF POINTER CONTACTS IN INTERACTIVE INPUT SYSTEMS

FIELD OF THE INVENTION

The present invention relates generally to interactive input systems, and in particular to a method for providing assistance in the detection and rejection of pointer contacts in said interactive input systems

BACKGROUND OF THE INVENTION

Interactive input systems that allow users to inject inputs such as digital ink, mouse events, text or the like into a computer program typically utilise an input method such as an active pointer (e.g. a pointer that emits light, sound or other signal) or a passive pointer (e.g., a finger, cylinder or other object). Alternatively these same inputs may be inputted via another suitable input device such as a mouse or trackball. These more conventional forms of input are less interactive compared to new interactive input systems using active or passive pointers. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001, all assigned to SMART Technologies ULC of Calgary, Alberta, Canada, assignee of the subject application, the entire disclosure of which are incorporated herein by reference; touch systems comprising touch panels employing electromagnetic, capacitive, acoustic or other technologies to register pointer input; tablet and laptop personal computers (PCs); personal digital assistants (PDAs) and other handheld devices; and other similar devices.

In any interactive input system requiring physical interaction with a display, there exists a common problem of determining the exact location of the physical interaction. This is particularly prevalent in touch systems where the physical contact of an active or passive pointer upon a display is intended to trigger an event on an attached computer system. The method of detecting the presence of a contact is unique to the technology employed in the interactive input system, in interactive input systems utilizing an optical or other vision based technology, the method is typically analyzing the output of an imaging device to determine the location of a pointer within the field of view of the imaging device.

A further hindrance to determining the exact location of a physical interaction with a display in an optical based interactive input system is the presence of unwanted contact with the display. For example, if a user is intending on touching the display with a finger in order to generate a touch event, the user may inadvertently also press on the display with the palm of their hand, or the sleeve of their shirt may contact the display. Either of these occurrences would generate touch events in the system which are not intended by the user, and would significantly reduce the functionality of the system.

Accordingly, improvements in interactive input systems to facilitate a greater number of true contacts are desired. It is therefore an object to provide a novel method for providing assistance in the detection and rejection of contact events in interactive input systems and a novel interactive input system employing the same.

SUMMARY OF THE INVENTION

In accordance with an aspect, there is provided a method comprising: obtaining a first location of a first pointer contact on an input surface; calculating a restricted area proximate the first location; processing the first pointer contact; and inhibit processing of a second location of a second pointer contact within the restricted area.

In accordance with a further aspect, there is provided a non-transitory computer-readable medium having stored thereon instructions which when executed by a processor cause the processor to: obtain a first location of a first pointer contact on an input surface; calculate a restricted area proximate the first location; process the first pointer contact; and inhibit processing of a second location of a second pointer contact within the restricted area.

In accordance with a yet further aspect, there is provided an interactive input system comprising: an input device configured to determine locations of pointer contacts thereon; memory storing instructions; and a processor configured to execute the instructions to: obtain a first location of a first pointer contact on an input surface; calculate a restricted area proximate the first location; process the first pointer contact; and inhibit processing of a second location of a second pointer contact within the restricted area.

BRIEF DESCRIPTION OF THE DRAWINGS

Embodiments will now be described more fully with reference to the accompanying drawings in which.

DETAILED DESCRIPTION OF THE EMBODIMENTS

Figure 1:
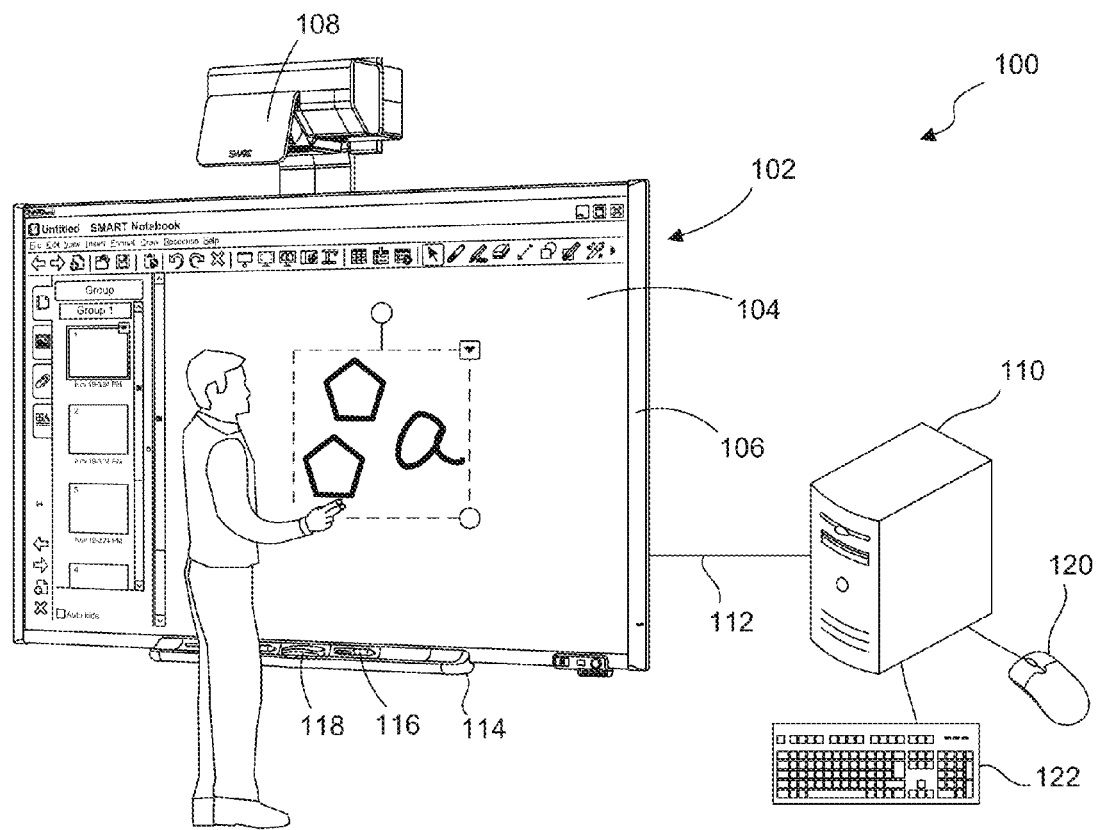
FIG. 1 is a perspective view of an interactive input system.

Shown in FIG. 1 is an interactive input system generally identified by reference numeral 100. Interactive input system 100 allows one or more users to inject input such as digital ink, mouse events, commands, etc. into an executing application program. In this embodiment, interactive input system 100 comprises a two-dimensional (2D) interactive device in the form of an interactive whiteboard (IWB) 102 mounted on a vertical support surface such as for example, a wall surface or the like. IWB 102 comprises a generally planar, rectangular interactive surface 104 that is surrounded about its periphery by a bezel 106. An ultra-short-throw projector 108 such as that sold by SMART Technologies ULC, under the name "SMART UX60", is also mounted on the support surface above the IWB 102 and projects an image, such as for example, a computer desktop, onto the interactive surface 104.

The IWB 102 employs machine vision to detect one or more pointers brought into a region of interest in proximity with the interactive surface 104. The machine vision utilized is typically based on optical sensors detecting the presence of one or more pointers, but may be any suitable touch technology such as projected capacitive, resistive, infra red and the like. The IWB 102 communicates with a general purpose computing device 110 executing one or more application programs via a universal serial bus (USB) cable 112 or other suitable wired or wireless communication link. General purpose computing device 110 processes the output of the IWB 102 and adjusts image data that is output to the projector 108, if required, so that the image presented on the interactive surface 104 reflects pointer activity. In this manner, the IWB 102, general purpose computing device 110 and projector 108 allow pointer activity proximate to the interactive surface 104 to be recorded as writing or drawing or used to control execution of one or more application programs executed by the general purpose computing device 110.

The bezel 106 is mechanically fastened to the interactive surface 104 and comprises four bezel segments that extend along the edges of the interactive surface 104. In this embodiment, the inwardly facing surface of each bezel segment comprises a single, longitudinally extending strip or band of retro-reflective material. To take best advantage of the properties of the retro-reflective material, the bezel segments are oriented so that their inwardly facing surfaces lie in a plane generally normal to the plane of the interactive surface 104.

A tool tray 114 is affixed to the IWB 102 adjacent the bottom bezel segment using suitable fasteners such as for example, screws, clips, adhesive etc. As can be seen, the tool tray 114 comprises a housing having an upper surface configured to define a plurality of receptacles or slots. The receptacles are sized to receive one or more pen tools 116 as well as an eraser tool 118 that can be used to interact with the interactive surface 104. Control buttons (not shown) are also provided on the upper surface of the tool tray housing to enable a user to control operation of the interactive input system 100. Further specifics of the tool tray 114 are described in U.S. Patent Application Publication No. 2011/0169736 to Bolt et al., filed on Feb. 19, 2010, and entitled "INTERACTIVE INPUT SYSTEM AND TOOL TRAY THEREFOR".

Imaging assemblies (not shown) are accommodated by the bezel 106, with each imaging assembly being positioned adjacent a different corner of the bezel. Each of the imaging assemblies comprises an image sensor and associated lens assembly that provides the image sensor with a field of view sufficiently large as to encompass the entire interactive surface 104. A digital signal processor (DSP) or other suitable processing device sends clock signals to the image sensor causing the image sensor to capture image frames at the desired frame rate. During image frame capture, the DSP also causes an infrared (IR) light source to illuminate and flood the region of interest over the interactive surface 104 with IR illumination. Thus, when no pointer exists within the field of view of the image sensor, the image sensor sees the illumination reflected by the retro-reflective bands on the bezel segments and captures image frames comprising a continuous bright band. When a pointer exists within the field of view of the image sensor, the pointer occludes reflected IR illumination and appears as a dark region interrupting the bright band in captured image frames.

The imaging assemblies are oriented so that their fields of view overlap and look generally across the entire interactive surface 104. In this manner, any pointer such as for example a user's finger, a cylinder or other suitable object, a pen tool 116 or an eraser tool 118 lifted from a receptacle of the tool tray 114, that is brought into proximity of the interactive surface 104 appears in the fields of view of the imaging assemblies and thus, is captured in image frames acquired by multiple imaging assemblies. When the imaging assemblies acquire image frames in which a pointer exists, the imaging assemblies convey pointer data to the general purpose computing device 110.

The general purpose computing device 110 in this embodiment is a personal computer or other suitable processing device comprising, for example, a processing unit, system memory (volatile and/or non-volatile memory), other non-removable or removable memory (e.g., a hard disk drive, RAM, ROM, EEPROM, CD-ROM, DVD, flash memory, etc.) and a system bus coupling the various computer components to the processing unit. The general purpose computing device 110 may also comprise networking capabilities using Ethernet, WiFi, and/or other suitable network format, to enable connection to shared or remote drives, one or more networked computers, or other networked devices. A mouse 120 and a keyboard 122 are coupled to the general purpose computing device 110.

The general purpose computing device 110 processes pointer data received from the imaging assemblies to resolve pointer ambiguity by combining the pointer data detected by the imaging assemblies, and to compute the locations of pointers proximate the interactive surface 104 (sometimes referred as "pointer contacts") using well known triangulation. The computed pointer locations are then recorded as writing or drawing or used as an input command to control execution of an application program as described above.

In addition to computing the locations of pointers proximate to the interactive surface 104, the general purpose computing device 110 also determines the pointer types (e.g., pen tool, finger or palm) by using pointer type data received from the IWB 102. Here, the pointer type data is generated for each pointer contact by at least one of the imaging assembly DSPs by differentiating a curve of growth derived from a horizontal intensity profile of pixels corresponding to each pointer tip in captured image frames. Specifics of methods used to determine pointer type are disclosed in U.S. Pat. No. 7,532,206 to Morrison, et al., and assigned to SMART Technologies ULC, the disclosure of which is incorporated herein by reference in its entirety.

Figure 2:
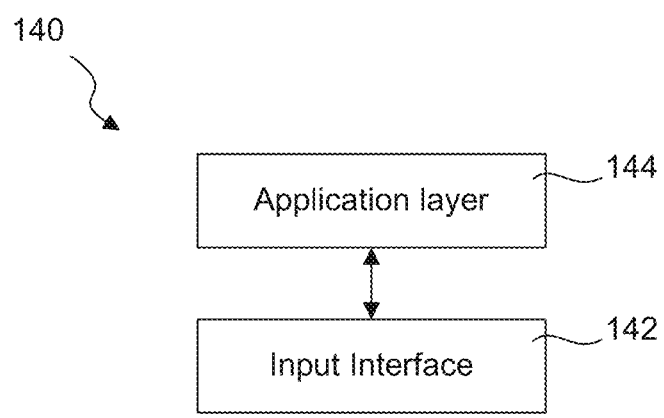
FIG. 2 is a simplified block diagram of the software architecture of the interactive input system of FIG. 1.

FIG. 2 shows exemplary software architecture used by the interactive input system 100, and which is generally identified by reference numeral 140. The software architecture 140 comprises an input interface 142, and an application layer 144 comprising one or more application programs. The input interface 142 is configured to receive input from various input sources generated from the input devices of the interactive input system 100. In this embodiment, the input devices include the IWB 102, the mouse 120, and the keyboard 122. The input interface 142 processes received input and generates input events. The generated input events are then transmitted to the application layer 144 for processing.

As one or more pointers contact the interactive surface 104 of the IWB 102, associated input events are generated by the input interface 142. The input events are generated from the time the one or more pointers are brought into contact with the interactive surface 104 (referred to as a contact down event) until the time the one or more pointers are lifted from the interactive surface 104 (referred to as a contact up event). As will be appreciated, a contact down event is similar to a mouse down event in a typical graphical user interface utilizing mouse input, wherein a user presses the left mouse button. Similarly, a contact up event is similar to a mouse up event in a typical graphical user interface utilizing mouse input, wherein a user releases the pressed mouse button. A contact move event is generated when a pointer is contacting and moving on the interactive surface 104, and is similar to a mouse drag event in a typical graphical user interface utilizing mouse input, wherein a user moves the mouse while pressing and holding the left mouse button.

Figure 3:
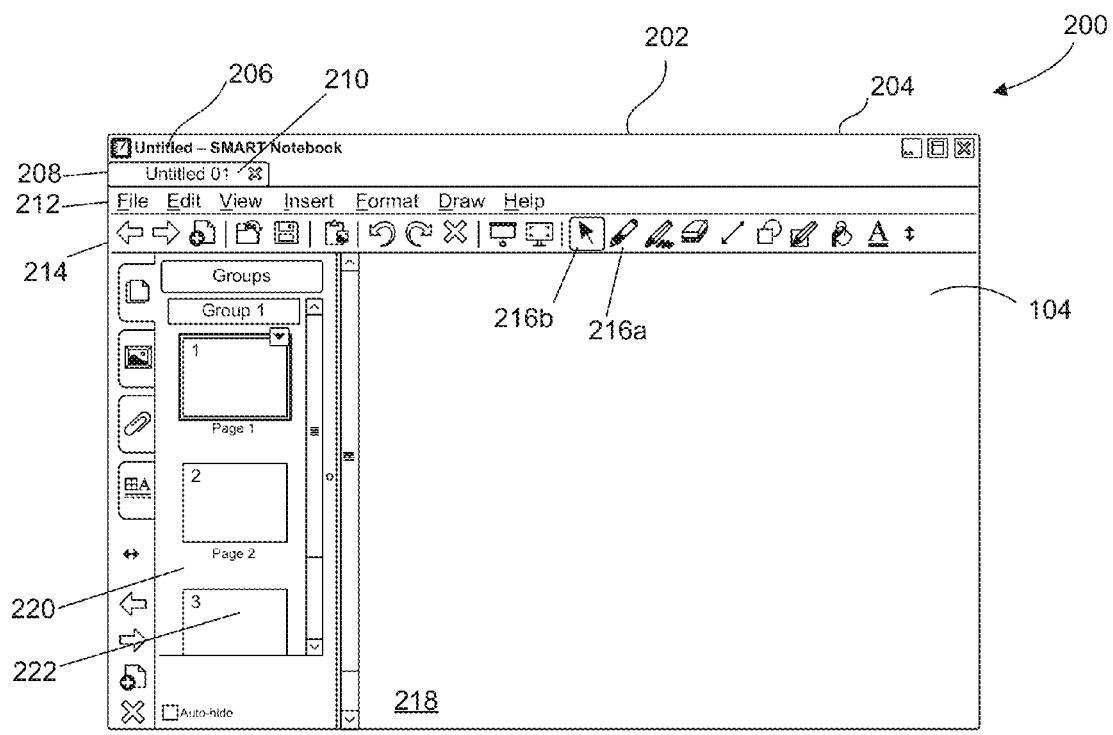
FIG. 3 illustrates an exemplary graphic user interface displayed on an interactive surface of the interactive input system of FIG. 1.

In this embodiment, one of the application programs in the application layer 144 is SMART Notebook™ offered by SMART Technologies ULC of Calgary, Alberta, Canada. As is known, SMART Notebook™ allows users to manipulate Notebook files. A Notebook file comprises one or more pages, and each page comprises a canvas and various graphical objects thereon, such as for example, text, images, digital ink, shapes, Adobe Flash objects, etc. As shown in FIG. 3, when executed by the general purpose computing device 110, SMART Notebook™ causes a graphic user interface 200 to be presented in an application window 202 on the interactive surface 104. As can be seen, the application window 202 comprises a border 204, a title bar 206, a tab bar 208 having one or more tabs 210, each of which indicates a file opened by SMART Notebook™, a menu bar 212, a toolbar 214 comprising one or more tool buttons 216, a canvas zone 218 for displaying a Notebook™ page and for injecting graphical objects such as for example, digital ink, text, images, shapes, Flash objects, etc. thereon, and a page sorter 220 for displaying thumbnails 222 of Notebook™ pages. In this embodiment, pointer contacts applied within the canvas zone 218 will be discussed. Input events applied to other parts of the Notebook™ window are processed in a well-known manner for operating menus, tool buttons or the application window, and as such will not be described herein.

Different users are able to interact simultaneously with the interactive input system 100 via IWB 102, mouse 120 and keyboard 122 to perform a number of operations such as for example injecting digital ink or text and manipulating graphical objects. In the event one or more users contact the IWB 102 with a pointer, the mode of the pointer is determined as being either in the cursor mode or the ink mode. The interactive input system 100 assigns each pointer a default mode. For example, a finger in contact with the interactive surface 104 is assigned by default the cursor mode while a pen tool in contact with the interactive surface 104 is assigned by default the ink mode. In this embodiment, the application program (SMART Notebook™) permits a user to change the mode assigned to the pointer by selecting a respective tool button on the tool bar 214. For example, in the event a user wishes to inject digital ink into the application program using her fingers, the user may select a tool button 216a associated with the ink mode on the tool bar 214. Similarly, in the event a user wishes to use a pen tool in the cursor mode, the user may select a tool button 216b associated with the cursor mode on the tool bar 214.

The application program processes input events received from the input interface 142 to recognize gestures based on the movement of one or more pointers in contact with the interactive surface 104. A gesture is a series of input events that match a set of predefined rules and are identified based on a number of criterion such as for example pointer contact type (simultaneous or non-simultaneous), the number of graphical objects selected, the graphical object type, the graphical object from which the gesture starts, the graphical object from which the gesture ends, and the gesture performed, wherein each contact described is a pointer contacting the interactive input surface 104. As will be appreciated, a graphical object is an object displayed on the interactive input surface 104 which in this embodiment is an object associated with SMART Notebook™ such as for example a page thumbnail 222 displayed in the page sorter 220, the canvas 218, or an object in the canvas 218 (e.g., an image, digital ink, text, a shape, a Flash object, etc.)

Figure 4:
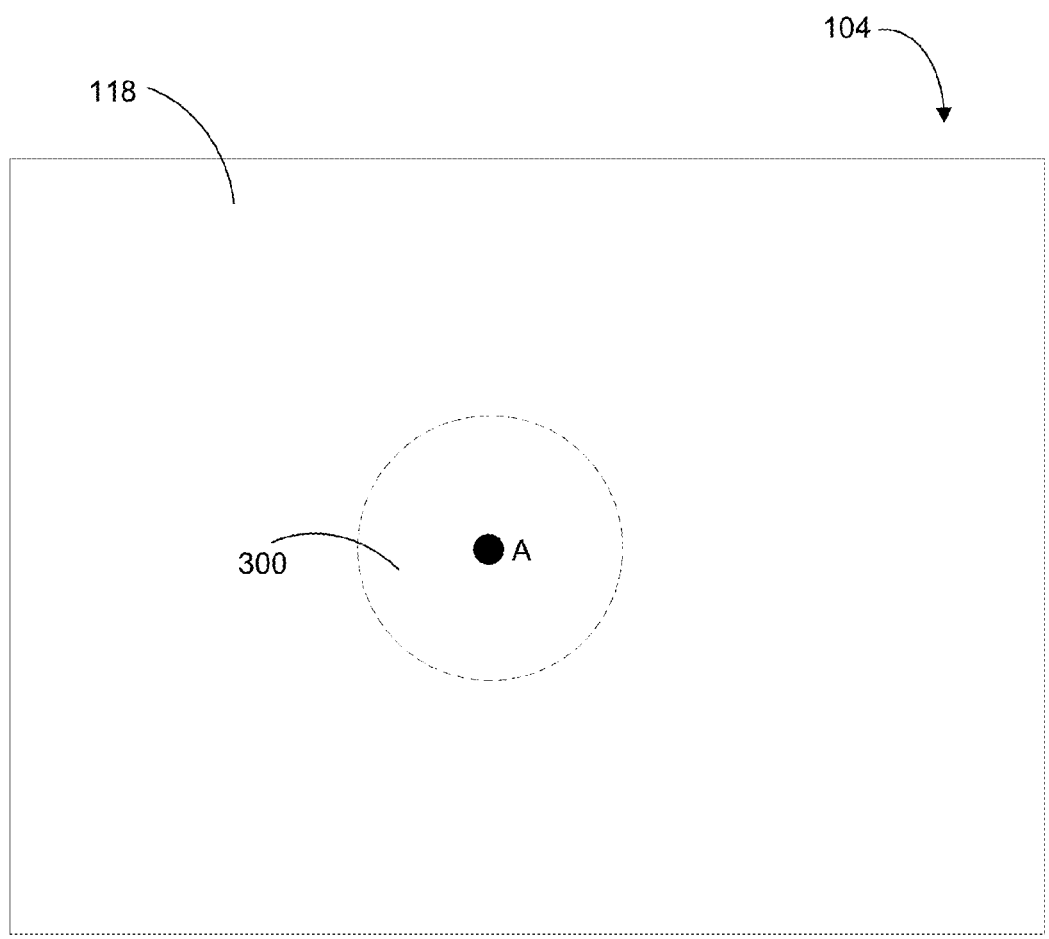
FIG. 4 illustrates a restricted area on an input surface according to one embodiment of the present invention.

FIG. 4 shows an enlarged view of the canvas 218 shown in FIG. 3. A contact point A is representative of a contact between the interactive surface 104 and a pointer device (not shown). In this embodiment, the location of contact point A is determined by the input interface 142 upon receiving pointer data detected by the imaging assemblies, as discussed above.

In order to inhibit the application programs executing on the application layer 144 from reacting to accidental touches on the interactive surface 104, a restricted area 300 is determined by the input interface 142. The restricted area 300 is not visibly displayed to a user and may vary in size. The restricted area 300 is configured to represent an area on the interactive surface 104 that is most susceptible to accidental contact based, at least in part, on the location of contact point A. Thus, pointer data received at the input interface 142 that falls within the restricted area 300 is considered to be accidental contact with the interactive surface 104 and is not used to generate input events.

Figure 5:
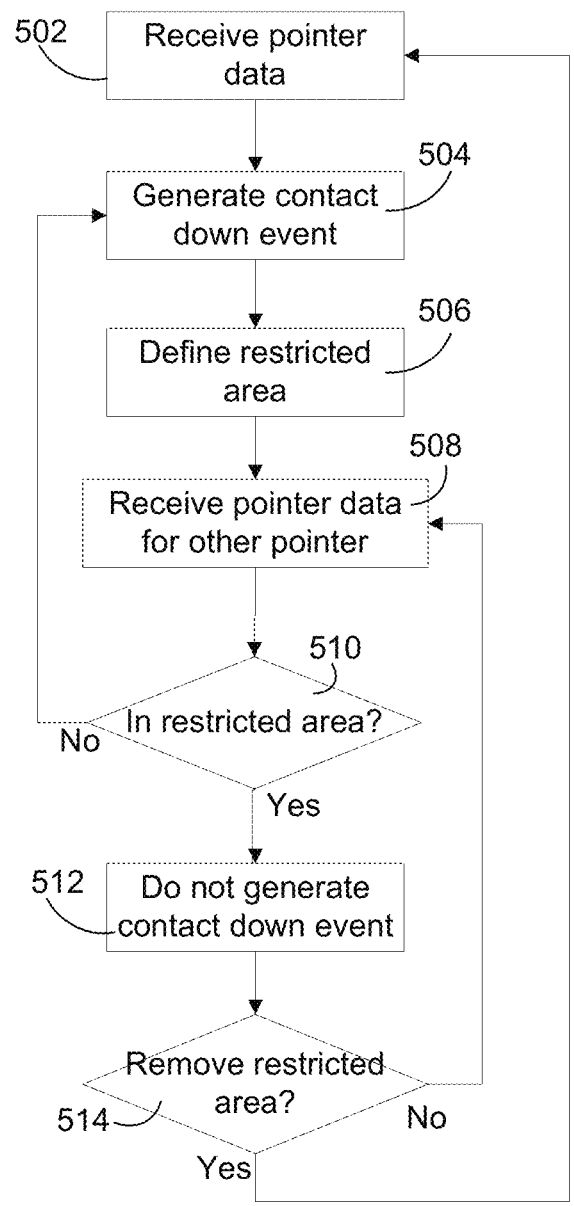
FIG. 5 is a flow chart illustrating the steps for implementing the restricted area on the input surface.

FIG. 5 shows a flow chart illustrating steps executed by the input interface 142 to implement the restricted area 300. At step 502 the input interface 142 receives pointer data for contact point A. At step 504, the input interface 142 generates a contact down event for contact point A and transmits it to the application layer 144. At step 506 the input interface 142 defines the restricted area 300. The size and shape of the restricted area 300 can depend on a number of factors including, for example, the position of contact point A, the configuration of the interactive surface 104, and the characteristics of the contact down event associated with contact point A, as will be described. At step 508, the input interface 142 receives pointer data for another pointer contact, different from pointer contact A. At step 510, the input interface 142 determines whether or not the other pointer contact falls within the restricted area 300. If the other pointer contact does not fall within the restricted area 300 then the input interface 142 continues at step 502 for the other pointer. If the other pointer contact does fall within the restricted area 300 then at step 512 a contact event is not generated for the other pointer contact. Optionally, the other pointer contact information may be stored for later access. At step 514, the input interface 142 determines whether or not the restricted area 300 is to be removed. The restricted area 300 is removed if a contact up event is detected for contact point A or after a predefined amount of time, depending on the implementation. If the restricted area 300 is to be removed, then the input interface 142 returns to step 502. If the restricted area 300 is not to be removed, then the input interface 142 returns to step 508. In this manner, inadvertent or accidental contact upon the input surface 104 may be ignored and the experience of the user may be improved.

Figure 6A:
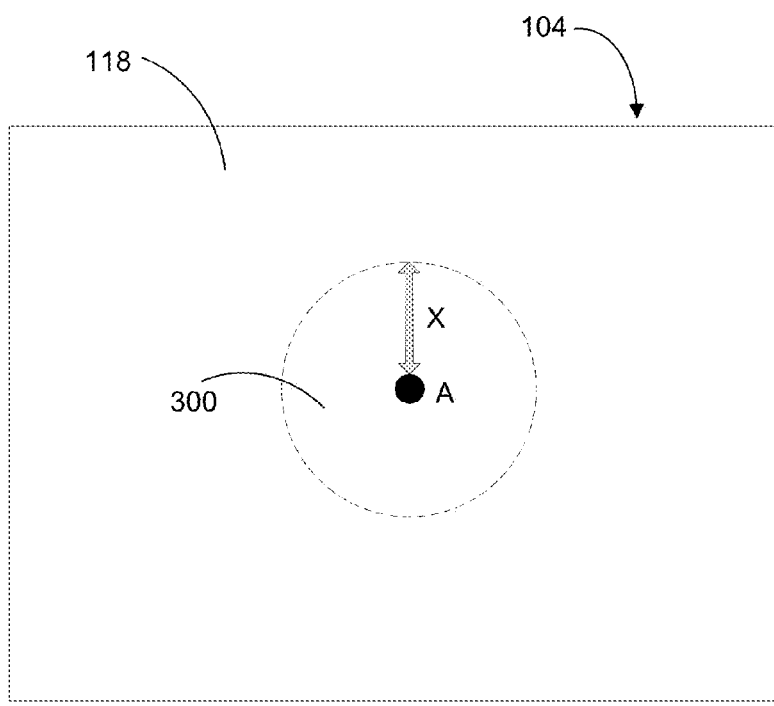
FIGS. 6A and 6B illustrate examples of the size and shape restricted area.

The following examples describe sample conditions that can lead to different sizes and shapes of the restricted area 300. FIG. 6A shows the restricted area 300 as a circle with radius X, where X is a predetermined value and extends from the location of contact point A. This is a useful configuration of the restricted area 300 if it is determined that the user is interacting with the input surface 104 in the cursor mode, using a pen tool or other pointer tool.

Figure 6B:
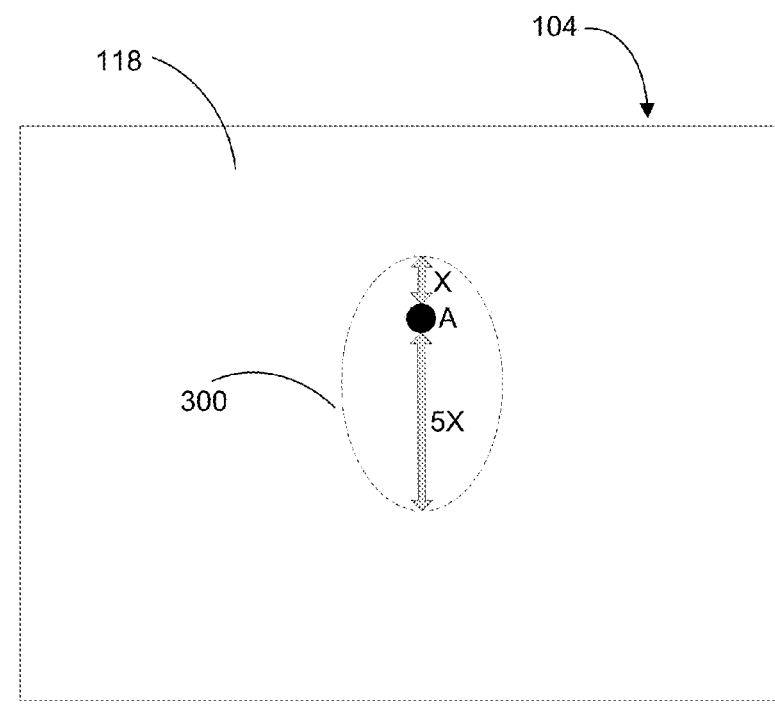

FIG. 6B shows the restricted area 300 as an elliptical shape. In this instance, the restricted area 300 is defined as a predetermined distance X above the location of contact point A and a predefined distance of 5× below the location of contact point A. This is a useful configuration of the restricted area 300 if the input surface 104 is in a vertical orientation and it is determined that the user is interacting with the input surface 104 in the ink mode. Given these conditions, it is most likely that accidental pointer contacts would be detected in the area below the user's writing hand. For example, a shirt sleeve may inadvertently contact the input surface 104 while writing.

The input interface 142 can explicitly be made aware of whether the user is interacting with the input surface 104 in either the ink mode or the cursor mode by communication with the application program. Alternatively, the input interface 142 could use other characteristics of the pointer data to make the determination itself. For example, by analyzing elements such as the degree of inflection between the pointer and input surface 104, the pressure of the pointer above the input surface 104 and any other information known about the pointer, such as the pointer type, the input interface 142 may determine the type of action being performed upon the input surface 104 and can define the shape and size of the restricted area 300 accordingly.

Additional information may also be used by the input interface 142 to determine the shape and size of the restricted area 300. For example, a number of pointer contacts that the interactive input system 100 is configured to receive simultaneously can be used. If the interactive input system 100 is only configured to process one pointer contact at a time, the restricted area 300 can be determined to be the entire input surface 104. If the interactive input system 100 is configured to process more than one pointer contact at a time, the restricted area 300 may be calculated as an area smaller than the input surface 104. In this embodiment, the greater the number of simultaneous pointer contacts for which the interactive input system 100 is configured, the smaller the restricted area 300.

Furthermore, the position of the user relative to the input surface 104 may be used to determine the position of the restricted area 300. For example, if the input interface 142 determines the location of contact point A to be within a left half of the input surface 104, it can be assumed that the user is standing proximate the left hand side of the input surface 104. Accordingly, it is likely that the user is reaching toward the input surface 104 from its left edge. Therefore, the input interface 142 can configure the restricted area 300 to extend further to the left of contact point A than to the right, to improve the likelihood of rejecting unintended pointer contacts.

Figure 7:
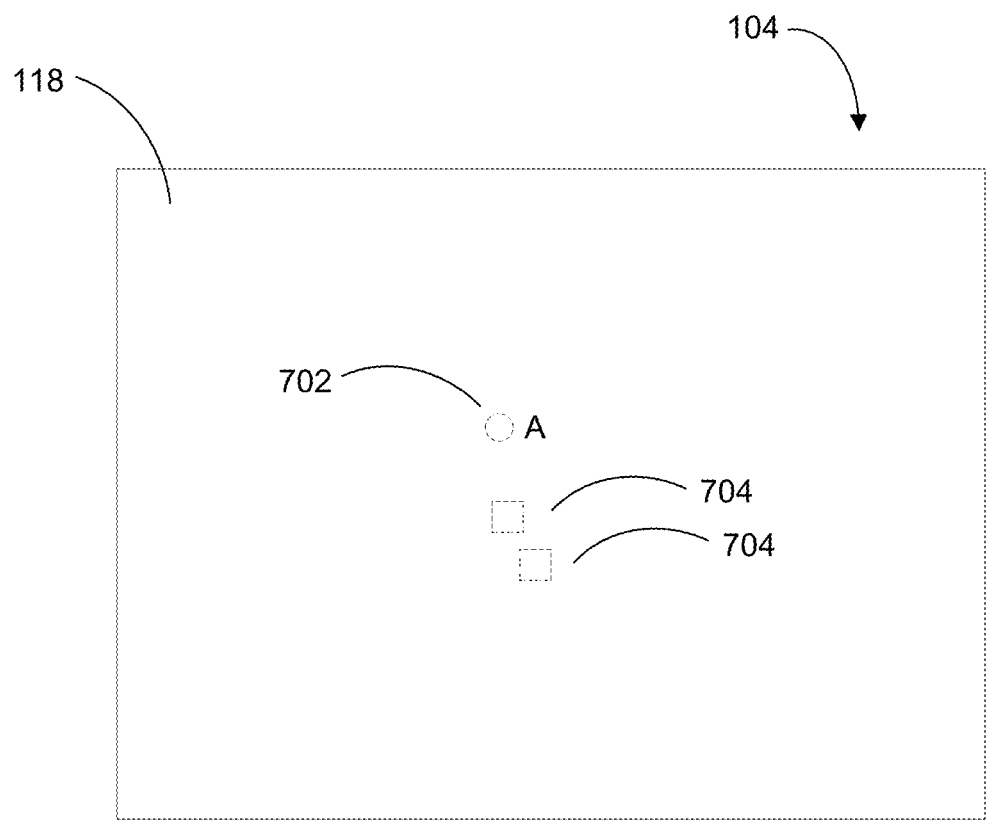
FIG. 7 illustrates an input surface configured to identify pointer contacts within the restricted area according to another embodiment of the present invention.

As described above, the restricted area 300 is not displayed to the user. However, it may be desirable to provide some feedback to the user that the input interface 142 is detecting pointer contacts that are considered to the unintentional. FIG. 7 shows an embodiment in which the pointer contacts detected in the restricted area are displayed to the user. As shown, contact point A is displayed on the input surface 104 using a first graphical marker 702. The first graphical marker 702 is visible to the user and in the present embodiment is represented by a broken-line circle. The first graphical marker 702 shows the user the pointer contact processed by the input interface 142. In this embodiment, the input interface 142 processes a pointer contact by generating a corresponding contact down input event and passing the contact down input event to the application layer 144.

Pointer contacts detected by the input interface 142 that are determined to be within the restricted area 300 are displayed on the input surface 104 using a second graphical marker 704. The second graphical marker 704 is visible to the user and in the present embodiment is represented by a broken-line square. The second graphical marker 704 shows the user the pointer contacts that is are not being processed by the input interface 142. In this embodiment, the input interface 142 does not process a pointer contact by not generating a corresponding contact down input event.

The second graphical markers 704 differ in shape from the first graphical marker 702 to allow the user to differentiate the pointer contacts that the input interface 142 is processing and pointer contacts that the input interface is not processing. As will be appreciated by a person of ordinary skill in the art, the shape and/or style of the first and second graphic markers 702 and 704 may vary depending on the implementation.

The input interface 142 may provide the user with the ability to remove the restricted area 300. For example, the input interface 142 may present an icon (not shown) that allows the user to remove the restricted area 300. Thus, the user can tell from the display of the first and second graphical markers 702 and 704 where all of the pointer contacts are being detected. If the user determines that the second graphic markers 704 represent deliberate pointer contacts, then the user can remove the restricted area 300.

Alternatively, the input interface 142 can present the first and second graphical markers 702 and 704 for a predefined amount of time, after which the restricted area 300 is removed. That is, the user is provided with the second graphic markers 704 of pointer contacts that are determined to be unintentional. If the user does not correct the issue within the predefined amount of time, then the input interface 142 assumes that the pointer contacts are, in fact intentional, and the restricted area 300 is removed. If the user corrects the issue by removing the pointer contacts within the predefined amount of time, then the input interface 142 confirms that the pointer contacts were unintentional and the restricted area 300 is maintained.

Although the embodiments described above are described with reference to an input area on the canvas 218 of the SMART Notebook™ application, it will be appreciated that the input area can encompass the entire application window 202, or the entire input surface 102. Further, it will be appreciated that application programs other than SMART Notebook™ can be executed in conjunction with the restricted area 300 implemented by the input interface 142.

Yet further, although the embodiments described above are described with reference to the restricted area 300 being implemented at the input interface 142, it can also be implemented at the application layer 144. In this embodiment, the application layer 142 processes a pointer contact by passing the input events received from the input interface 142 to one or more of the application programs. The application layer 144 does not process a pointer contact by withholding the input events received from the input interface 142 from the one or more of the application programs. Alternatively, the restricted area 300 can also be implemented at the application program itself. In this embodiment, the application program processes a pointer contact by acting on the input event. The application program does not process a pointer contact by discarding the input event.

Yet further, although the embodiments described above are described as implementing a restricted area 300 when the user is interacting with the input surface 104 in either ink mode or cursor mode, in an alternative embodiment, the restricted area 300 is implemented only when it is determined that the user is interacting with the input surface 104 in ink mode. This can still be effective because of a high likelihood of unintentional pointer contacts when the user is writing on the input surface 104.

Yet further, although the embodiments described above are described with respect to a vertically positioned interactive input system 100, other implementations can be used. For example, a horizontally positioned interactive table can be provided. In this example, the orientation of the input surface 104 may also be used to configure the size of the restricted area 300. For example, the restricted area 300 may be defined as larger in any given direction than the embodiments in which the orientation of the input surface is vertical. This difference is because users often rest their arm on a horizontal input surface while interacting there with, especially when writing.

Although in embodiments described above, the input surface 104 is described as employing machine vision to register pointer input those skilled in the art will appreciate that other input surfaces 104 employing other machine vision configurations, analog resistive, electromagnetic, capacitive, acoustic or other technologies to register input may be employed. Also, the interactive input surface need not be mounted, supported or suspended in a generally upright orientation. The interactive boards may take other non-upright orientations.

For example, the input surface 104 may be employed of forms such as for example: LCD screens with camera based touch detection (for example SMART Board™ Interactive Display, model 8070i); projector based interactive whiteboards employing analog resistive detection (for example SMART Board™ interactive whiteboard Model 640); projector based interactive whiteboards employing surface acoustic wave (SAW) touch detection; projector based interactive whiteboards employing capacitive touch detection; projector based interactive whiteboards employing camera based detection (for example SMART Board™, model SBX885ix); touch tables (for example SMART Table™, such as that described in U.S. Patent Application Publication No. 2011/0069019 assigned to SMART Technologies ULC, the entire disclosure of which are incorporated herein by reference); slate computers (for example SMART Slate™ Wireless Slate Model WS200); and podium-like products (for example SMART Podium™ Interactive Pen Display) adapted to detect passive touch (for example fingers, pointer, etc, in addition to or instead of active pens). Yet further, other input surface types may also be employed. For example, large scale capacitive touch technology, such that used in Perceptive Pixel devices by Microsoft®, may be employed. As another example, IR Grid systems, such as the multi-touch screens offered by PQ Labs, Inc., may be employed. As yet another example, IR through a pane of glass, such as the Opteo technology offered by Rapt Touch, Inc., may be employed.

Other types of products that utilize touch interfaces such as for example tablets, smartphones with capacitive touch surfaces, flat panels having touch screens, track pads, and the like may also be employed.

The input interface 142, application layer 144 and application programs may comprise program modules including routines, object components, data structures, and the like, and may be embodied as computer readable program code stored on a non-transitory computer readable medium. The computer readable medium is any data storage device that can store data. Examples of computer readable media include for example read-only memory, random-access memory, CD-ROMs, magnetic tape, USB keys, flash drives and optical data storage devices. The computer readable program code may also be distributed over a network including coupled computer systems so that the computer readable program code is stored and executed in a distributed fashion.

Although embodiments have been described above with reference to the accompanying drawings, those of skill in the art will appreciate that variations and modifications may be made without departing from the scope thereof as defined by the appended claims.

What is claimed is:

1. A method comprising: obtaining a first location of a first pointer contact on an input surface, wherein the first pointer contact is created by a first pointer; calculating a restricted area proximate and surrounding the first location; processing the first pointer contact; inhibiting processing of a second location of a second pointer contact within the restricted area, wherein the second pointer contact is from a second pointer different from the first pointer that created the first pointer contact on the input surface; and after receiving an instruction specified by a user to remove the restricted area via an icon displayed on the input surface, removing the restricted area accordingly.

2. The method of claim 1, wherein the method is implemented at an input processor and processing the first pointer contact comprises generating a first contact input event and sending the first contact event to an application layer.

3. The method of claim 1, wherein the method is implemented at an application layer and processing the first pointer contact comprises communicating a first contact input event to an application program.

4. The method of claim 1, wherein the method is implemented at an application program and processing the first pointer contact comprises acting on a first contact input event.

5. The method of claim 1, further comprising determining whether a mode associated with the first pointer contact is an ink mode or a cursor mode.

6. The method of claim 5, wherein the restricted area is sized and shaped based on the determination of the mode.

7. The method of claim 6, wherein the restricted area is substantially circular when the mode is determined to the cursor mode.

8. The method of claim 6, wherein the restricted area is substantially elliptical when the mode is determined to the ink mode.

9. The method of claim 8 wherein the restricted area extends in a first and second direction from the location of the first pointer contact, wherein the second direction is at least twice the size of the first direction.

10. The method of claim 5, wherein processing of the second pointer contact is inhibited only if the mode is determined to be the ink mode.

11. The method of claim 1, wherein the restricted area is sized and shaped toward a position of a user's torso relative to the input surface.

12. The method of claim 1 wherein:
a first graphical item is displayed on the input surface at the first location indicating the first pointer contact was processed as an intentional contact; and a second graphical item is displayed on the input surface at the second location indicating the second pointer contact was inhibited from processing as an intentional contact, the second graphical item being different from the first graphical item.

13. The method of claim 1 further comprising storing the second contact down event for future communication to the computer system.

14. The method of claim 1 further comprising removing the restricted area upon detection of a contact up event generated for the first pointer contact.

15. The method of claim 1 further comprising removing the restricted area after a predefined period of time.

16. The method of claim 1, wherein the restricted area is a first restricted area and the method further comprises:
   obtaining a third location of a third pointer contact outside of the first restricted area;
   calculating a second restricted area proximate and surrounding the third location;
   processing the third pointer contact; and
   recalculating the size and shape of the first restricted area based at least on the third location of the third pointer contact.

17. The method of claim 1, wherein the restricted area is a first restricted area and the method further comprises:
   obtaining a third location of a third pointer contact within the first restricted area;
   after receiving an instruction to process the third pointer contact as an intentional contact, processing the third pointer contact;
   calculating a second restricted area proximate and surrounding the third location; and
   recalculating the size and shape of the first restricted area based at least on the third location of the third pointer contact.

18. The method of claim 1, wherein the restricted area is sized and shaped based on an orientation of the input surface.

19. A non-transitory computer-readable medium having stored thereon instructions which when executed by a processor cause the processor to:
   obtain a first location of a first pointer contact on an input surface, wherein the first pointer contact is created by a first pointer;
   calculate a restricted area proximate the first location;
   process the first pointer contact;
   inhibit processing of a second location of a second pointer contact within the restricted area,
      wherein the second pointer contact is from a second pointer different from the first pointer that created the first pointer contact on the input surface; and
   after receiving an instruction specified by a user to remove the restricted area via an icon displayed on the input surface, remove the restricted area accordingly.

20. An interactive input system comprising: an input device configured to determine locations of pointer contacts thereon; memory storing instructions; and a processor configured to execute the instructions to: obtain a first location of a first pointer contact on an input surface, wherein the first pointer contact is created by a first pointer; calculate a restricted area proximate the first location; process the first pointer contact; inhibit processing of a second location of a second pointer contact within the restricted area wherein the second pointer contact is from a second pointer different from the first pointer that created the first pointer contact on the input surface; and after receiving an instruction specified by a user to remove the restricted area via an icon displayed on the input surface, remove the restricted area accordingly.

* * * * *